(12) United States Patent
Shimizu

(10) Patent No.: US 8,661,857 B2
(45) Date of Patent: Mar. 4, 2014

(54) METHOD OF MANUFACTURING OPTICAL FIBER PREFORM

(75) Inventor: Yoshiaki Shimizu, Gunma (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 106 days.

(21) Appl. No.: 13/040,141

(22) Filed: Mar. 3, 2011

(65) Prior Publication Data

US 2012/0055199 A1  Mar. 8, 2012

Related U.S. Application Data

(63) Continuation of application No. PCT/JP2009/004382, filed on Sep. 4, 2009.

(30) Foreign Application Priority Data

Sep. 5, 2008 (JP) ................................. 2008-228909

(51) Int. Cl.
*C03B 37/012* (2006.01)
(52) U.S. Cl.
USPC ............................................ 65/427; 65/435
(58) Field of Classification Search
USPC ....................................... 65/427, 435
See application file for complete search history.

(56) References Cited

U.S. PATENT DOCUMENTS

| 4,230,472 A | * | 10/1980 | Schultz ............................ 65/416 |
| 4,310,339 A | * | 1/1982 | Blankenship ..................... 65/416 |
| 2003/0053778 A1 | | 3/2003 | Koumura et al. |
| 2005/0214543 A1 | | 9/2005 | Koumura et al. |

FOREIGN PATENT DOCUMENTS

| JP | H07-033463 A | 2/1995 |
| JP | 2003-089541 A | 3/2003 |
| JP | 2003-212576 A | 7/2003 |
| JP | 2006-193397 A | 7/2006 |
| JP | 2006-219331 A | 8/2006 |

OTHER PUBLICATIONS

International Search Report (ISR) issued in PCT/JP2009/004382 (parent application) mailed in Dec. 2009 for Examiner consideration, citing U.S. Patent Application Publication No. 1 and Foreign Patent document Nos. 1-5 listed above.
Written Opinion (PCT/ISA/237) issued in PCT/JP2009/004382 (parent application) mailed in Dec. 2009.

* cited by examiner

*Primary Examiner* — Queenie Dehghan

(57) ABSTRACT

Provided is a method of manufacturing an optical fiber preform, comprising obtaining a base material ingot by sintering a porous glass base material at a high temperature to change the porous glass base material into glass while retaining an unsintered portion at one end thereof that is not completely changed to glass; and while relatively moving a heating means in a longitudinal direction of the base material ingot, applying a tensile force to a heated portion and beginning to extend the unsintered portion from one side to decrease a diameter of and extend the base material ingot.

14 Claims, 9 Drawing Sheets

METHOD OF MANUFACTURING OPTICAL FIBER PREFORM

TECHNICAL FIELD

The present invention relates to a method of manufacturing an optical fiber preform that involves thermally extending a base material ingot made of synthetic quartz and controlling the change in the outer diameter of the preform, particularly in a region where the extension is finished. The contents of the following Patent Applications are incorporated herein by reference, Japanese Patent Application No. 2008-228909 filed on Sep. 5, 2008, and International Application PCT/JP2009/004382, filed on Sep. 4, 2009.

BACKGROUND ART

Axial deposition and outside deposition are widely known methods for forming an optical fiber preform, and involve obtaining a porous glass base material by depositing glass fine particles generated by hydrolyzing a silicon compound such as silicon tetrachloride in an oxyhydrogen flame.

FIG. 1 schematically shows an apparatus for manufacturing the porous glass base material using the outside deposition technique. In the outside deposition technique, dummy rods 2 fused to both ends of a core material, referred to as the target, are held by chucks 3 and rotated, and a burner 4 for silicon deposition is moved back and forth across the longitude of the target 1, thereby depositing the glass fine particles generated in the flame 5 onto the target 1 as a layer.

The porous glass base material 6 formed in this way is tapered at both ends, and the dummy rods 2 are attached to the tips at both ends.

Next, as shown in FIG. 2, the porous glass base material 6 undergoes a sintering process that involves sintering in a heating furnace 7 to change the porous glass base material 6 into transparent glass, thereby obtaining the base material ingot. Usually, the sintering involves connecting the dummy rods 2 of the porous glass base material 6 to a suspended sintering rod 8, which is suspended vertically in the core tube 9, and moving the porous glass base material 6 vertically relative to the heating furnace 7. As a result, the change to transparent glass gradually occurs from one end toward the other end, thereby forming the base material ingot.

In the process for forming the transparent glass, it is common for the tapered portion where the sintering begins to be completely finished while the tapered portion at the opposite end retains a portion that is not completely changed to glass, i.e. an unsintered portion. The reason for this is that the sintering of the base material ingot is performed with the porous glass base material 6 being vertically suspended, and therefore, when the portion where the sintering ends is reached, the entire weight of the ingot formed by the glass resulting from the hydrolysis is added. The tapered end is left unsintered in order to prevent this weight from extending the thin-diameter portion. Therefore, as shown in FIG. 3, the sintered base material ingot 10 includes the unsintered portion 11.

Japanese Patent Application Publication No. 2003-089541, for example, discloses a method that involves obtaining an optical fiber by drawing, as-is, the base material ingot having the unsintered portion in the upper region manufactured as described above. This base material ingot after sintering, as described in the above Publication, has an outer diameter that differs along the longitude thereof due to the gravitational force exerted on the base material ingot during sintering. Furthermore, the base material ingot usually has a diameter of 100 mm or more, and base material ingots manufactured recently often have diameters exceeding 170 mm, or 100 kg.

In order to draw as-is a base material ingot with such a large diameter and differing outer diameter across its longitude, it is necessary to increase the size of the drawing furnace to house the differing outer diameter. Furthermore, the gas seal mechanism of the portion that inserts the base material ingot to the drawing furnace becomes complicated.

In many drawing furnaces, a preform is used whose diameter is 80 mm and whose external diameter is within a range of ±1% of the average outer diameter. In order to obtain this preform, the base material ingot that has been changed into transparent glass is roughly extended to have a thickness near the diameter of the preform to be used for drawing in the extension process, i.e. the extension in the furnace, using an electric furnace as shown in FIG. 4.

In FIG. 4, the base material ingot 10 is lowered by a furnace extension lowering rod 12 into an electric furnace 14 including heaters 13. Rough extension is performed by adding a tensile force to a furnace extension pulling rod 16 whose bottom end is connected to pulling rollers 15.

The roughly extended preform is extended until reaching a state where the diameter across the entire length thereof differs by no more than 1% from the external diameter, using a glass lathe, and the optical fiber is formed by performing the drawing process after polishing the surface of the preform with a flame.

A flame is used for the extension by the glass lathe and there is a limit on the heating ability thereof, and therefore it is difficult to correct large differences in the outer diameter. Therefore, with the rough extension during the furnace extension process, the difference in diameter of the preform if preferably made as small as possible.

In a widely known technique, the base material ingot is suspended vertically during the furnace extension process as well, and the preform extending below the heating furnace is drawn. Therefore, the dummy rod from which the base material ingot is suspended is used for suspension during both the sintering process and the furnace extension process. In this case, the portion of the base material ingot that has been completely changed to glass is the portion that begins the furnace extension first, and the portion that has yet to be changed to glass, which is arranged toward the top, gradually proceeds to undergo the furnace extension.

When furnace extension is performed with this arrangement, as shown in FIG. 5, the diameter of the preform is particularly large in the region where the extension ends. Since the portion changed to glass and the unsintered portion have different thermal conductivity and specific heat, the extended portion changes more, even at the same temperature. Furthermore, if the feeding amount of the base material is increased too much, the base material can tear at the border where the change to glass occurs.

One technique for preventing the upper portion from being extended first in the region where extension ends, as described in Japanese Patent Application Publication No. H07-033463, involves placing a thermal insulating jig on the upper portion of the base material ingot. However, effort is required to place the jig prior to the extension, and the jig makes it difficult to sufficiently achieve the effect of restricting the diameter change, particularly for base material ingots with large diameters greater than or equal to 150 mm.

DISCLOSURE OF THE INVENTION

Problems to be Solved by the Invention

It is an object of the present invention to solve the above problems by providing a method for manufacturing an optical fiber preform that involves restricting difference in diameter of the preform in the region where the extension of the base material ingot ends, thereby obtaining a preform with a uniform diameter across its length.

Means for Solving the Problems

According to a first aspect of the present invention, provided is a method of manufacturing an optical fiber preform, comprising obtaining a base material ingot by sintering a porous glass base material at a high temperature to change the porous glass base material into glass while retaining an unsintered portion at one end thereof that is not completely changed to glass; and while relatively moving a heating means in a longitudinal direction of the base material ingot, applying a tensile force to a heated portion and beginning to extend the unsintered portion from one side to decrease a diameter of and extend the base material ingot.

The summary clause does not necessarily describe all necessary features of the embodiments of the present invention. The present invention may also be a sub combination of the features described above.

BEST MODE FOR CARRYING OUT THE INVENTION

Hereinafter, some embodiments of the present invention will be described. The embodiments do not limit the invention according to the claims, and all the combinations of the features described in the embodiments are not necessarily essential to means provided by aspects of the invention.

Figure 1:
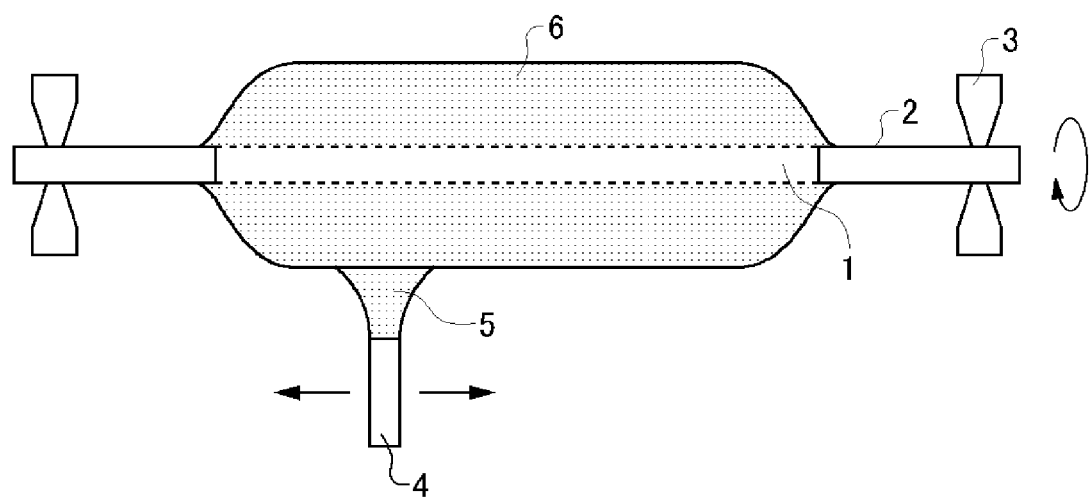
FIG. 1 is a schematic view of the manufacturing of a porous glass base material using the outside deposition technique.
Figure 2:
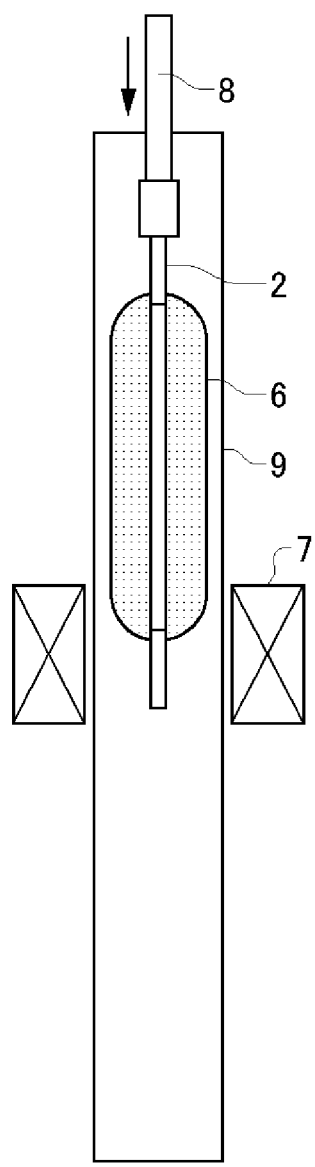
FIG. 2 is a schematic view of the sintering and changing into glass of a porous glass base material.
Figure 3:
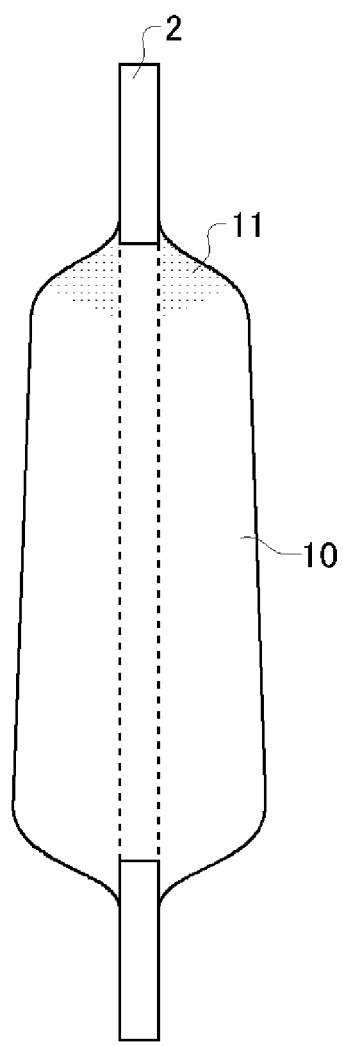
FIG. 3 shows the state of a sintered base material ingot.
Figure 4:
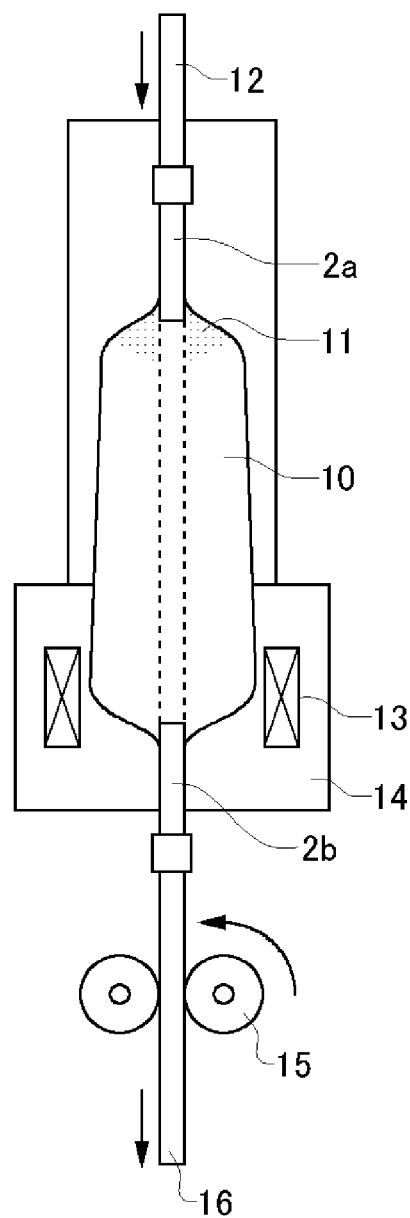
FIG. 4 shows the extension process of a base material ingot.

As shown in FIG. 4, the conventional method for manufacturing a preform involves suspending the base material ingot such that the portion that has been changed to transparent glass is at the bottom, inserting the base material ingot into an extension furnace up to the end of the base material ingot, and drawing the preform extending from the bottom of the furnace.

The reason for orienting the portion changed to transparent glass on the bottom is that, usually, the dummy rod used to suspend the preform is also used in the sintering and glass transformation process performed before the furnace extension process. Since an unsintered portion remains on the upper dummy rod side, which is the dummy rod used to suspend the preform during the sintering and glass transformation process, the portion that has been changed to glass is positioned on the bottom for the furnace extension process as well, and extension is then performed.

The preform manufactured in this way has a much larger diameter in the region where extension is finished, but after exhaustive study, the reason for this was found to be the following.

Figure 5:
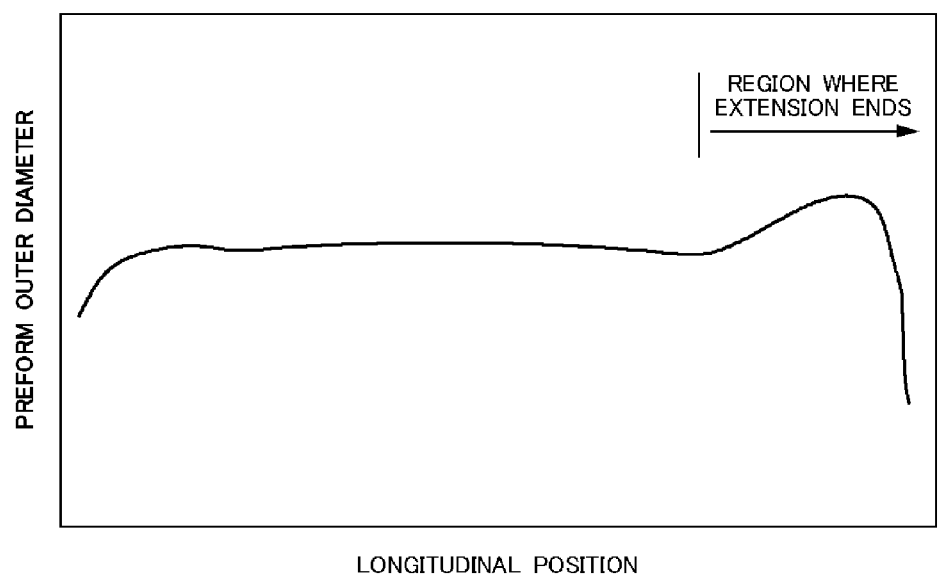
FIG. 5 is a graph showing the diameter change across the longitude of a preform that has undergone the furnace extension.

In the furnace extension process, the base material ingot is inserted to a heating furnace whose temperature is raised to approximately 2,000° Celsius to be softened in the furnace, and the molten preform is drawn from below the heating furnace. The heat radiated by the heat generators in the heating furnace is transmitted vertically within the base material ingot. The base material ingot is transparent and can be easily passed through by light, but the light transmitted upward cannot pass beyond the border with the unsintered portion in the upper region. Therefore, this border portion is exposed to a high temperature for a longer time than the transparent portion and cannot hold the direct heating from the heating furnace when the extension is finished, causing melting. As a result, in a region near the portion where extension ends, it is not the position having the highest temperature in the heating furnace, but rather a region further up, that melts first and begins extending first, and so a portion with a large diameter caused by insufficient extension and a portion that is thin due to over extension arise, as shown in FIG. 5.

The inventors arrived at the present invention by finding, based on the above knowledge, that the above problems can be solved using the inverse of the conventional method, i.e. by inserting the base material ingot into the extension furnace beginning with the unsintered portion side and then beginning the extension. In other words, the method of manufacturing an optical fiber preform according to the present invention involves performing the processes up to the furnace extension according to the widely known method, and in the following sintering process, performing the furnace extension on the base material ingot, which has the unsintered portion remaining at one end thereof, beginning with the unsintered portion side. For example, the furnace extension can be begun when the base material ingot is suspended such that the unsintered portion is positioned at the bottom and the portion changed to glass up to the end of the base material ingot is positioned on the top.

In this case, when the extension is begun from the unsintered portion, heat is focused in the region where the extension begins, and therefore the initial heating temperature is set to be 50° Celsius lower than usual. When the extension proceeds, the unsintered portion is expelled from the heating furnace and cooled, and therefore the temperature does not increase greatly. On the other hand, the upper portion of the base material ingot is completely changed to transparent glass, and therefore the heat radiated by the heat generators passes through the base material ingot and is emitted from the top. As a result, the base material ingot is not locally heated. Even when the furnace extension proceeds and the region near the top tapered portion melts, the tip above this region does not melt first, and therefore the resulting preform has an outer diameter with little difference up to the end thereof.

The following describes some embodiments of the present invention, along with comparative examples, but the present invention is not limited to these embodiments.

First Embodiment

A porous glass base material was formed by using the outside deposition technique to deposit glass fine particles on a target made of synthetic quartz glass and containing a core. A dummy rod affixed to one end of the porous glass base material was held and the porous glass base material was inserted into a sintering furnace while being suspended vertically. The porous glass base material was moved downward while being heated to 1,500° Celsius and being exposed to processing gases such as He, $Cl_2$, and $O_2$. At the end of this process, the sintering was completed with the unsintered portion remaining on the upper portion thereof, thereby obtaining the base material ingot.

Figure 6:
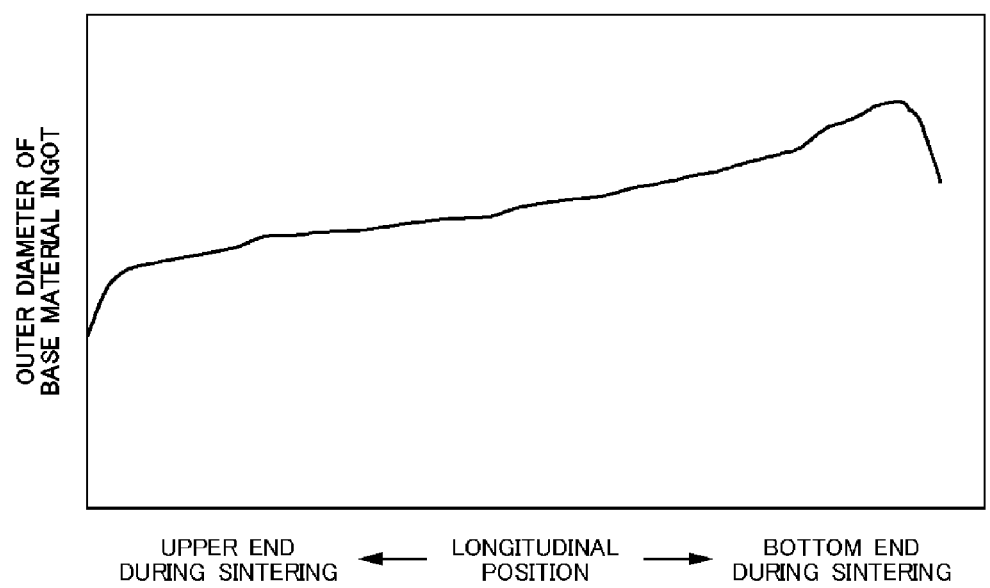
FIG. 6 is a graph showing the measurement results of the outer diameter of a base material ingot obtained by sintering and changing the porous glass base material into glass.

The outer diameter of this base material ingot was measured across the longitude thereof, and the results are shown in FIG. 6. In FIG. 6, the right end of the horizontal axis shows the position where sintering was begun and the left side shows the position where the sintering ended. As made clear from FIG. 6, the diameter gradually increases moving downward, and the diameter is extremely large immediately before the position where the sintering ends.

Figure 7:
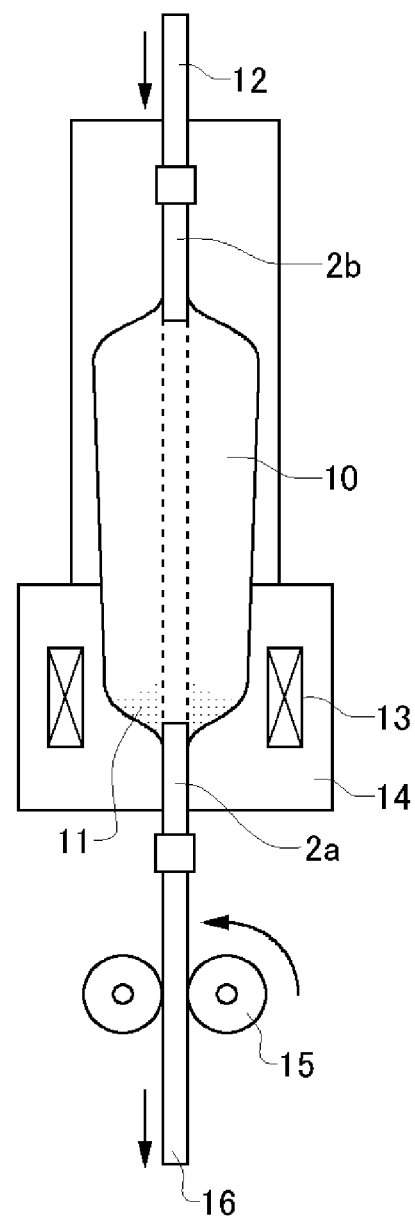
FIG. 7 shows the extension process of a base material ingot performed according to the First Embodiment.

Next, as shown in FIG. 7, with the unsintered portion 11 oriented downward, the base material ingot 10 was suspended vertically and held by the dummy rod 2b from the end that was changed to glass, and the bottom end of the base material ingot 10 was inserted into the heating furnace 14. Next, the set temperature of the heating furnace 14 was raised to 1,950° Celsius, and the extension was begun by pulling the furnace extension pulling rod 16 via the bottom dummy rod 2a from below the heating furnace 14. During the extension, the base material ingot 10 was extended to the objective diameter of 80 mm by changing the pulling speed of the preform, according to the outer diameter during the extension, while feeding the base material ingot 10 into the furnace at a speed of 20 mm/min.

Figure 8:
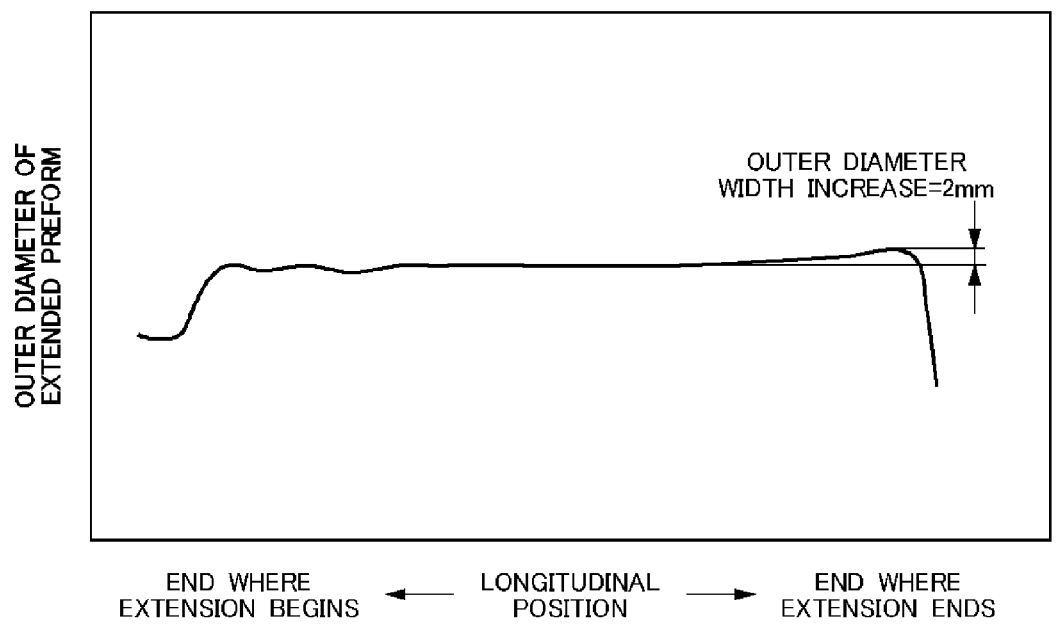
FIG. 8 is a graph showing measurement results of the outer diameter of a preform obtained using the First Embodiment.

The outer diameter of the extended preform was measured along its longitude, and the results are shown in FIG. 8. In FIG. 8, the left side of the horizontal axis shows the position where extension was begun and the right side shows the position where the extension ended. As made clear from FIG. 8, the maximum diameter increase in the region where extension ended was approximately 2 mm, and this confirms that the increase of the diameter of the preform in the region where the extension ended was effectively restricted.

COMPARATIVE EXAMPLE 1

A base material ingot was manufactured in the same manner as in the First Embodiment.

Next, with the unsintered portion 11 oriented upward, the base material ingot 10 was suspended vertically and held by the dummy rod 2a on the end having the unsintered portion 11, and the bottom end of the base material ingot 10 was inserted into the heating furnace 14, as shown in FIG. 4. Next, the set temperature of the heating furnace 14 was raised to 1,950° Celsius and the base material ingot 10 was heated from the bottom. When the heated portion of the base material ingot became soft, the extension was begun by pulling the furnace extension pulling rod 16 via the bottom dummy rod 2b from below the heating furnace 14. During the extension, the base material ingot 10 was extended to the objective diameter of 80 mm by changing the pulling speed of the preform, according to the outer diameter during the extension, while feeding the base material ingot 10 into the furnace at a speed of 20 mm/min.

Figure 9:
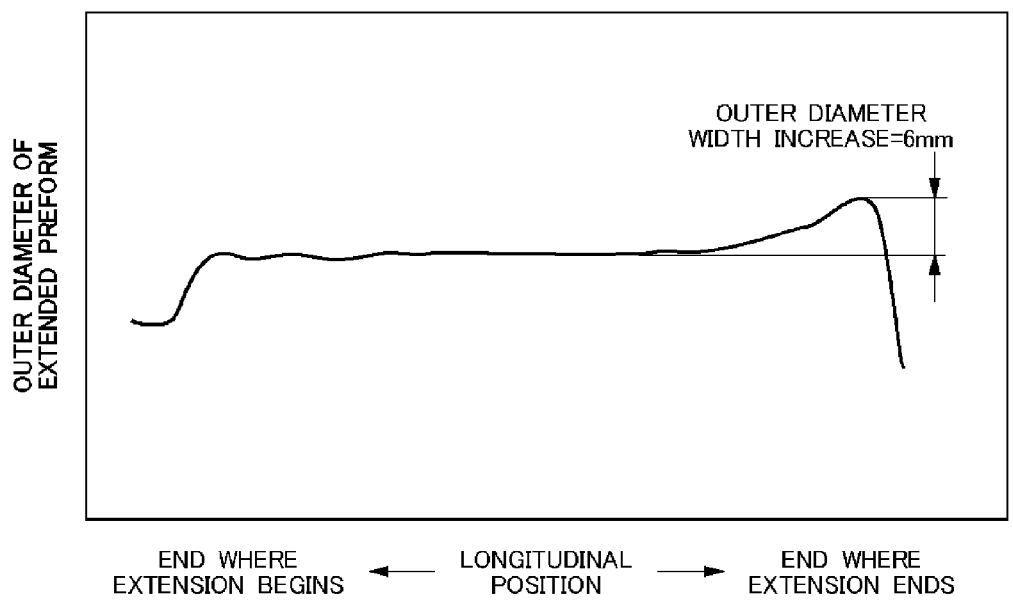
FIG. 9 is a graph showing measurement results of the outer diameter of a preform obtained using the First Comparative Example.

The outer diameter of the extended preform was measured along the longitude thereof, and the results are shown in FIG. 9. As made clear from FIG. 9, the maximum diameter increase in the region where extension ended was approximately 6 mm, and this is a large change in the preform diameter in the region where the extension ended.

Therefore, the present invention can decrease the outer diameter of the preform in the region where extending of the base material ingot ends, thereby obtaining a preform with a uniform diameter across the length thereof and improving yield of the preform. Accordingly, the present invention improves the yield of the preform to provide a great improvement to the mass production of optical fiber preforms.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The invention claimed is:

1. A method of manufacturing an optical fiber preform, comprising:
    obtaining a base material ingot by sintering a porous glass base material at a high temperature to change the porous glass base material into glass while retaining an unsintered portion at one end thereof that is not completely changed to glass; and
    while a heating means and the base material ingot move relative to each other in a longitudinal direction of the base material ingot, applying a tensile force to the base material ingot so as to decrease a diameter of and extend the base material ingot beginning from the one end at which the unsintered portion is retained.

2. The method of manufacturing an optical fiber preform according to claim 1, wherein
    during said obtaining, the porous glass base material is arranged such that the unsintered portion is in an upper portion of the base material ingot.

3. The method of manufacturing an optical fiber preform according to claim 1, wherein
    during said applying, heating temperature applied to the unsintered portion is lower than heating temperature applied to a portion that has been changed to glass.

4. A method of manufacturing an optical fiber preform comprising:
    obtaining a base material ingot by sintering a porous glass base material at a high temperature to change the porous glass base material into glass while retaining an unsintered portion at one end thereof that is not completely changed to glass; and
    while a heating means and the base material ingot move relative to each other in a longitudinal direction of the base material ingot, applying a tensile force to the base material ingot so as to decrease a diameter of and extend the base material ingot beginning from the one end at which the unsintered portion is retained, wherein
during said applying, the base material ingot is lowered into an extension furnace and arranged such that the unsintered portion is at a bottom of the base material ingot.

5. The method of manufacturing an optical fiber preform according to claim 4, wherein
during said obtaining, the porous glass base material is arranged such that the unsintered portion is in an upper portion of the base material ingot.

6. The method of manufacturing an optical fiber preform according to claim 4, wherein
during said applying, heating temperature applied to the unsintered portion is lower than heating temperature applied to a portion that has been changed to glass.

7. The method of manufacturing an optical fiber preform according to claim 4, wherein
during said applying, the unsintered portion is expelled from a heating furnace and cooled.

8. A method of manufacturing an optical fiber preform comprising:
obtaining a base material ingot by sintering a porous glass base material at a high temperature to change the porous glass base material into glass while retaining an unsintered portion at one end thereof that is not completely changed to glass; and
while a heating means and the base material ingot move relative to each other in a longitudinal direction of the base material ingot, applying a tensile force to the base material ingot so as to decrease a diameter of and extend the base material ingot beginning from the one end at which the unsintered portion is retained, wherein
when decreasing the diameter of and extending the base material ingot, the base material ingot is inserted into an extension furnace starting with the side on which the unsintered portion is retained.

9. The method of manufacturing an optical fiber preform according to claim 8, wherein
during said obtaining, the porous glass base material is arranged such that the unsintered portion is in an upper portion of the base material ingot.

10. The method of manufacturing an optical fiber preform according to claim 8, wherein
during said applying, heating temperature applied to the unsintered portion is lower than heating temperature applied to a portion that has been changed to glass.

11. The method of manufacturing an optical fiber preform according to claim 8, wherein
during said applying, the unsintered portion is expelled from a heating furnace and cooled.

12. A method of manufacturing an optical fiber preform comprising:
obtaining a base material ingot by sintering a porous glass base material at a high temperature to change the porous glass base material into glass while retaining an unsintered portion at one end thereof that is not completely changed to glass; and
while a heating means and the base material ingot move relative to each other in a longitudinal direction of the base material ingot, applying a tensile force to the base material ingot so as to decrease a diameter of and extend the base material ingot beginning from the one end at which the unsintered portion is retained, wherein
during said applying, the unsintered portion is expelled from a heating furnace and cooled.

13. The method of manufacturing an optical fiber preform according to claim 12, wherein
during said obtaining, the porous glass base material is arranged such that the unsintered portion is retained in an upper portion of the base material ingot.

14. The method of manufacturing an optical fiber preform according to claim 12, wherein
during said applying, heating temperature applied to the unsintered portion is lower than heating temperature applied to a portion that has been changed to glass.

* * * * *